C. T. HENDERSON.
CONTROLLER FOR ELECTRIC MOTORS.
APPLICATION FILED OCT. 28, 1913.
1,189,947
Patented July 4, 1916.
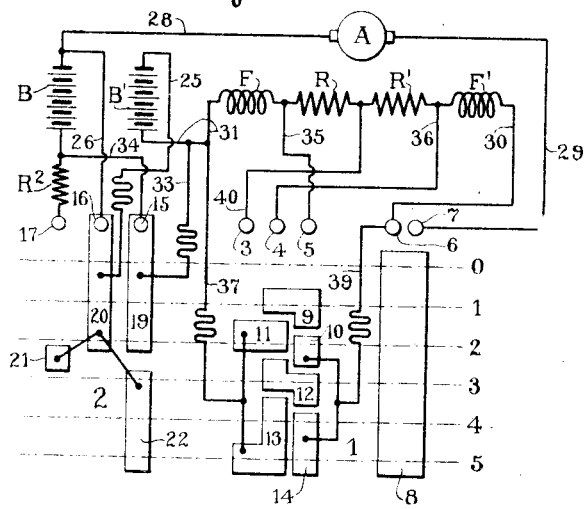
Fig. 1.
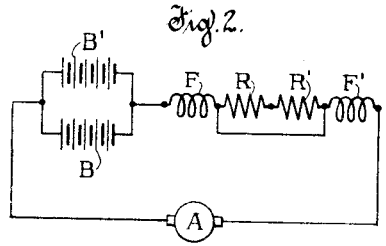
Fig. 2.
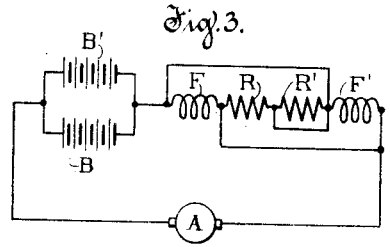
Fig. 3.
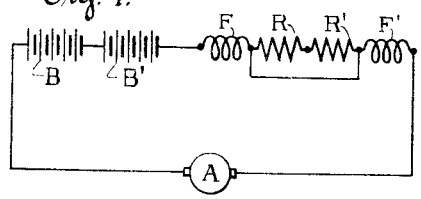
Fig. 4.
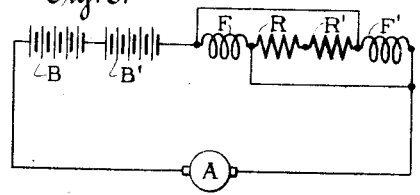
Fig. 5.
Fig. 6.
Witnesses
J. L. Johnson
J. A. Watson
Inventor
Clark T. Henderson
By Edwin B. H. Tower Jr.
Attorney

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR ELECTRIC MOTORS.

1,189,947. Specification of Letters Patent. Patented July 4, 1916.

Application filed October 28, 1913. Serial No. 797,900.

*To all whom it may concern:*

Be it known that I, CLARK T. HENDERSON, a citizen of the United States, residing at Milwaukee, in the county of Milwaukee and State of Wisconsin, have invented new and useful Improvements in Controllers for Electric Motors, of which the following is a full, clear, concise, and exact description, reference being had to the accompanying drawing, forming a part of this specification.

My invention relates to improvements in controllers for electric motors. It is particularly applicable to motors the speed of which is varied by commutation of its field windings or by joint commutation of its field windings and supply batteries, as in motor vehicles.

My invention has among its objects to provide a controller whereby the speed regulation of such motors may be affected in a more practical and efficient manner than heretofore provided.

Other objects and advantages of my invention will hereinafter appear.

According to the preferred form of my invention I provide for both field and battery commutation and for shunting of the field windings to different degrees when connected in parallel, and in the accompanying drawings I have schematically illustrated a controller for affecting this control. It should, of course, be understood that certain features of my invention might be embodied in other forms and might be employed where battery commutation is omitted.

In the accompanying drawing, Figure 1 is a view of the complete controller; and, Figs. 2 to 6 inclusive are simplified diagrams of the different connections established thereby.

The motor shown is provided with an armature A and series field windings F and F′ and is supplied with power from batteries B and B′.

The controller is of the drum type and is provided with two sections 1 and 2 for controlling the field windings and batteries respectively. The section 1 is provided with contact fingers 3, 4, 5, 6, and 7 and coöperating segments 8, 9, 10, 11, 12, 13 and 14. The section 2 is provided with contact fingers 15, 16, 17, and coöperating contact segments 19, 20, 21 and 22. The two sections are operable together and have five operative positions and an initial starting position.

In conjunction with the field windings F, F′ are two resistances R and R′ or a single resistance divided into two sections, and in conjunction with the batteries is a resistance $R^2$.

Briefly set forth the controller operates to effect the following connections in the order named: First,—it closes the motor circuit with the field windings in series and the batteries in parallel and with both resistances R and R′ momentarily included in the motor circuit. When the first operative position is reached the connections are such as illustrated in Fig. 2, with both of said resistances excluded. The resistances R and R′ are thus utilized for starting. Second,—leaving the batteries in parallel it connects the field windings in parallel with the resistance R in shunt with the latter, as is shown in Fig. 3. Third,—it changes the battery connections from parallel to series, at the same time restoring the field windings to series relation with both resistances R and R′ excluded from circuit, as illustrated in Fig. 4. Fourth,—leaving the batteries in series it again connects the field windings in parallel with both resistances R and R′ in shunt around the same, as shown in Fig. 5. Fifth,—maintaining the same connections of the batteries and field windings it short-circuits resistance R′, as shown in Fig. 6.

Reverting to the parallel connections of the field windings, it will thus be seen that under some conditions the windings are shunted by one resistance and under other conditions they are shunted by both resistances. The variable shunt thus provided performs a very important function.

As is well understood the transition of the fields from series to parallel with the batteries in parallel effects a relatively small increase in speed, while the transition to batteries-series and fields-series effects a relatively large variation in speed, and the transition to batteries-series and fields-parallel again only effects a relatively slight increase in speed. The speed variations thus obtained are few and very irregular. Accordingly, such regulation would be very inadequate in many instances, as, for example, automobile service where the speed of the vehicle must be adapted to various different traffic conditions and where provision must be made for a choice of several well graduated running speeds. On the other hand, the aforesaid variable shunt for the field windings provides for an increased number of speeds and an extremely satisfactory graduation thereof. For example, it has been found that in automobile service the controller above described will provide five speeds bearing the relation of approximately 10, 13, 16, 18, and 20 miles per hour.

Again referring to Fig. 1, the circuit connections are as follows: Upon initial movement of the controller segment 8 bridges contacts 6 and 7. This completes a circuit from the upper terminal of battery B', by a flexible lead 25 to contact segment 20, thence to contact 16, by conductor 26 to the corresponding terminal of battery B, and by conductor 28 through the motor armature by conductor 29 to contact 7, through segment 8, to contact 6, by conductor 30 through field winding F', resistances R' and R and field winding F successively, by conductor 31 to the opposite terminal of battery B' and by conductor 33, drum contacts 19 and 15 and conductor 34 to battery B. Thus the motor is started with the batteries in parallel and the fields in series and with the resistances R and R' included in the circuit. When, however, the full first position is reached segment 9 of the controller bridges contacts 4 and 5 which short-circuits both resistances R and R'. This short-circuit extends from the left hand side of resistance R by conductor 35 to contact 5, through segment 9 to contact 4, by conductor 36 to the right hand side of resistance R'. The foregoing connections are illustrated in a very simple form in Fig. 2.

As the controller is moved to the second position contact 4 is disengaged by segment 9, contacts 3 and 4 engaged by segment 11 and contact 5 disengaged by segment 9 and engaged by segment 10. Segment 11, upon bridging contacts 3 and 4, short-circuits the field winding F and resistances R and R', this short-circuit extending from the left hand terminal of field winding F', by conductor 36 to contact 4 and segment 11, by flexible conductor 37 to conductor 31. Segment 10 upon engaging contact 5 connects the fields in parallel with one another and also in parallel with resistance R. Under these conditions the circuit of field winding F' may be traced from conductor 30 through said winding, by conductor 36 through contact 4 and segment 11, to conductor 37 and thence to conductor 31. The circuit of resistance R may be traced from conductor 30 to contact 6, by flexible conductor 39 to segment 10 and finger 5, by conductor 35 through said resistance, by conductor 40 to contact 3 and thence by conductor 37 to conductor 31. The circuit of the field winding F may be similarly traced from conductor 30 to conductor 35 through said winding to conductor 31. These circuits are illustrated in a very simplified form in Fig. 3.

It will thus be seen that in moving from position 1 to position 2 the continuity of the motor circuit is maintained, thereby maintaining continuous torque of the motor.

The controller in its movement from position 2 to position 3 restores the field winding to series relation and changes the batteries from parallel to series. The former change is made by disengagement of the segment 11 from contacts 3 and 4 and engagement of segment 12 with contacts 4 and 5 successively. When segment 11 disengages contacts 3 and 4 the parallel connections are interrupted and a short-circuit established around the resistances R, R' and field winding F'. Circuit then extends from conductor 29 through contact 7, segment 8, and contact 6, by conductor 30, through segment 10 and contact 5, by conductor 35 through field winding F to conductor 31. When segment 10 disengages contact 5, segment 12 simultaneously engages the same, whereby circuit is immediately established from conductor 30 through field winding F', by conductor 36 to contact 4 and segment 12, to contact 5 and conductor 35 and thence through field winding F to conductor 31. This restores the field windings to series relation with the resistances R, R' excluded from circuit, as illustrated in Fig. 4. Simultaneously with these changes section 2 of the drum operates to first engage contact 17 by segment 21, then disengage segments 19 and 20 from contacts 15 and 16 and finally engage contact 15 by segment 22. Segment 21, upon engaging contact 17, connects the resistance R² in parallel to the batteries, said connection extending from conductor 34 through said resistance to contact 17, to segment 21 and thence to conductor 25. Segments 19 and 20 upon disengaging contacts 15 and 16 leave the batteries in series with the resistance R². Circuit may then be traced from battery B' by conductor 25 to segment 20, thence to segment 21 and contact 17 and to and through resistance R² to battery B. Segment 22 upon engaging contact 15 then short-circuits resistance R² from the upper terminal thereof by conductor 34 through said segment 22 to segment 20 and through conductor 25 to upper terminal of battery B'. The connections thus obtained are illustrated in a simplified form in Fig. 4.

From the foregoing it will be seen that the continuity of the motor circuit is also maintained in both restoring the field windings to series relation and in changing the batteries from parallel to series and thereby again insuring continuous torque of the motor.

The controller in moving to the fourth position effects the same change in the field connection as in its movement from position 1 to 2 and in the same manner except that it includes both resistances in parallel with the fields, due to the fact that the contact finger 3 is not engaged during this operation. The connections thus established are shown in a simplified form in Fig. 5.

The controller in moving to the fifth position moves segment 13 into engagement with contact 3, thereby short-circuiting resistance R'. This short-circuit extends from the right hand terminal of said resistance by conductor 36 to contact 4 through segment 13 to contact 3 and thence by conductor 40 to the left hand terminal of said resistance. The connections are then as illustrated in Fig. 6.

What I claim as new and desire to secure by Letters Patent is:

1. In combination, a motor having a plurality of field windings normally in series, a resistance and controlling means to commutate said field windings from series to parallel and to shunt the same through said resistance at a single step and thereafter vary said resistance.

2. In combination, a motor having a plurality of series field windings normally connected in series, a resistance normally in series with said windings, and means for progressively removing said resistance from circuit for starting, and paralleling said windings with one another and with different amounts of said resistance for speed regulation.

3. The combination with a motor having a plurality of field windings, of a plurality of supply batteries, means for commutating said batteries, a variable resistance and means to commutate said field windings and to control said resistance, said second mentioned means being operable during parallel connection of said batteries to commutate said field windings from series to parallel with a shunt through a part only of said resistance and during series connection of said batteries to commutate said field windings from series to parallel with a shunt through all of said resistance and thereafter to exclude a part of said shunting resistance.

4. In a motor controller, in combination, a resistance normally included in the motor circuit and means for excluding said resistance from circuit for starting and thereafter commutating the motor field windings and shunting the field windings when paralleled through different amounts of said resistance.

5. The combination with a motor having a plurality of series field windings, of a plurality of supply batteries, a variable resistance and circuit controlling means operable to complete the motor circuit with said batteries in parallel and said field windings in series for one speed, then parallel said field windings with one another and a part only of said resistance for the next speed, then commutate said batteries to series relation at the same time restoring the fields to series relation for the next speed, then parallel said field windings with one another and with all of said resistance for the next speed and then vary said resistance for further speed variation.

6. The combination with a motor having a plurality of series field windings, of a resistance, and means operable to complete the motor circuit with said field windings and said resistance all in series, then exclude said resistance from circuit, then parallel said field windings with one another and with said resistance and then vary said resistance.

In witness whereof, I have hereunto subscribed my name in the presence of two witnesses.

CLARK T. HENDERSON.

Witnesses:
F. H. HUBBARD,
S. F. WATSON.